US011806685B2

(12) United States Patent
Picou et al.

(10) Patent No.: US 11,806,685 B2
(45) Date of Patent: Nov. 7, 2023

(54) SLURRY LOOP REACTOR POLYMERIZATION RATE AND QUALITY CONTROLLER

(71) Applicant: ExxonMobil Chemical Patents Inc., Baytown, TX (US)

(72) Inventors: Douglas J. Picou, Baton Rouge, LA (US); Keith W. Trapp, Kingwood, TX (US); Kelly M. Forcht, Louisville, KY (US); Asha C. Quant, Houston, TX (US); Ariana L. Poindexter, Houston, TX (US); Maxwell T. Mcgee, Baton Rouge, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 675 days.

(21) Appl. No.: 16/998,204

(22) Filed: Aug. 20, 2020

(65) Prior Publication Data

US 2021/0077974 A1 Mar. 18, 2021

Related U.S. Application Data

(60) Provisional application No. 62/899,819, filed on Sep. 13, 2019.

(51) Int. Cl.
  *B01J 19/06* (2006.01)
  *B01J 19/00* (2006.01)
  (Continued)

(52) U.S. Cl.
  CPC .......... *B01J 19/06* (2013.01); *B01J 19/0033* (2013.01); *B01J 19/2455* (2013.01); *C08F 10/02* (2013.01);
  (Continued)

(58) Field of Classification Search
  CPC ..... C08F 2/01; C08F 2400/02; B01J 19/0033; B01J 19/2435
  (Continued)

(56) References Cited

U.S. PATENT DOCUMENTS 3,356,667 A 12/1967 Smith et al.
3,998,995 A 12/1976 Buss et al.
(Continued)

FOREIGN PATENT DOCUMENTS

WO WO 2006/052590 A2 * 5/2006 ............... G21C 9/00

OTHER PUBLICATIONS

Ohshima, M. et al. (Apr. 2000) "Quality control of polymer production processes", Journal of Process Control, Oxford, GB, vol. 10, No. 2-3, pp. 135-148.

*Primary Examiner* — Fred M Teskin
(74) *Attorney, Agent, or Firm* — ExxonMobil Technology and Engineering Company-Chemicals

(57) ABSTRACT

A process and system for maintaining optimum polymerization production in a loop polymerization reactor by continuously and periodically obtaining polymerization results, such as melt index (MI), production rate and ash content of the polymer produced, determining whether each of the results is within desired ranges, storing and averaging recently obtained results in a database within a reaction rate controller program, and when one of the results is out of the desired range modifying at least one reaction parameter set-point such as monomer concentration, catalyst feed rate and reactor temperature to drive any out-of-range polymerization result(s) toward the desired range for that result.

20 Claims, 4 Drawing Sheets

(51) Int. Cl.
*B01J 19/24* (2006.01)
*C08F 10/02* (2006.01)
*C08F 2/01* (2006.01)

(52) U.S. Cl.
CPC ............... *B01J 2219/00202* (2013.01); *B01J 2219/00234* (2013.01); *B01J 2219/00238* (2013.01)

(58) Field of Classification Search
USPC ............................................ 526/60; 700/269
See application file for complete search history.

(56) References Cited

U.S. PATENT DOCUMENTS

| | | |
|---|---|---|
| 5,602,300 A | 2/1997 | Gossen et al. |
| 7,517,938 B2 | 4/2009 | Mihan et al. |
| 7,601,783 B2 | 10/2009 | Davis et al. |
| 8,101,691 B2 | 1/2012 | Goode et al. |
| 10,835,890 B2 | 11/2020 | Cann et al. |

* cited by examiner

SLURRY LOOP REACTOR POLYMERIZATION RATE AND QUALITY CONTROLLER

CROSS-REFERENCE TO RELATED APPLICATION

This application claims the benefit of U.S. Provisional Application 62/899819 filed Sep. 13, 2019 entitled "Slurry Loop Reactor Polymerization Rate and Quality Controller", the entirety of which is incorporated by reference herein.

FIELD

Disclosed is a process and system for optimizing polymerization rate and polymer quality during polymerization in a slurry loop reactor.

BACKGROUND

Polymer production rate and quality in slurry loop reactors are known to be affected by various reaction parameters, such as monomer concentration, catalyst feed rate and reactor temperature. To optimize polymer production rate and quality, one or more of these parameters may be varied. For example, if the production rate is too low, reactor temperature may be increased, within certain limits, to more thoroughly polymerize the monomer(s) within the reactor loop. But if the reactor temperature called for exceeds the limits of the reactor, it can be advantageous to increase the amount of catalyst fed to the reactor, such as by dropping catalyst more frequently into the reactor, to increase polymer production rate Polymer quality is often defined by various physical characteristics of the polymer formed during the polymerization process, such as the molecular weight of the resulting polymer and/or the ash content. For polymers which are formed from primarily olefin monomers, polymer molecular weight can often be expressed by the melt index (MI).

Conventionally, loop polymerization reactors are controlled manually, i.e. by one or more operators who must continuously monitor the various reaction parameters as well as the results of those parameters; production rate and polymer quality. However, due to limitations as to the operator's time, it is difficult to efficiently monitor all aspects of the reactor operation and input reaction parameter updates in a manner which optimizes all of the desired polymerization results consistently. As such, either or both of low production rate or off-spec polymer properties can occur.

It would be advantageous to have a process and system which automatically monitors and updates polymerization reaction parameters so as to maintain consistent polymerization results.

SUMMARY

Presented herein is a process for optimizing polymerization of a monomer in a loop polymerization reactor controlled by a reaction rate controller program, comprising continuously and periodically obtaining polymerization results comprising at least melt index (MI), production rate and ash content on the polymerized monomer, the reaction rate controller program (RRC) determining whether each of the polymerization results is within predetermined target ranges for those results, storing recently obtained polymerization results in a computer readable database stored within the RRC, and averaging the recently obtained results with previously stored results, and when at least one of the polymerization results is out-of-range with respect to its predetermined target range, modifying at least one reaction parameter set-point comprising monomer concentration, catalyst feed rate and reactor temperature, and controlling associated hardware for modifying reaction parameter set-point(s) to drive any out-of-range polymerization result(s) toward the predetermined target range for that result.

In one form, the process further comprises the RRC assessing the reasonableness of the MI result when the MI result is out-of-range, and if the result is unreasonable, retaining it for comparison to subsequently obtained MI results, without averaging it with previously stored MI results.

In this form, when at least one subsequently obtained MI result is reasonable with respect to a previously-obtained unreasonable MI result, the RRC updating the MI average obtained at current reaction parameter set-point(s).

In another form, when the production rate is above its predetermined target range, the RRC decreases the catalyst feed rate set-point and/or vary the reactor temperature set-point and/or decrease monomer concentration set point until a production rate result reasonable progress rate toward its predetermined target range is established.

In this form, when the MI result is below its predetermined target range, the RRC increases reactor temperature, and when the MI result is above its predetermined target range, the RRC decreases reactor temperature In another form, when the production rate is within its predetermined target range but the MI result is below its predetermined target range, the RRC can increase the catalyst feed rate set-point and/or increase the reactor temperature set-point and/or decrease monomer concentration set point.

In yet another form, when the production rate is within its predetermined target range but the MI result is above its predetermined target range, the RRC can decrease the catalyst feed rate set-point and/or decrease the reactor temperature set-point and/or increase monomer concentration set point.

In another form, when the production rate is below its predetermined target range, the RRC increases the catalyst feed rate set-point and/or vary the reactor temperature set-point and/or increase monomer concentration set point until a production rate result reasonable progress rate toward its predetermined target range is established.

In this form, when the MI result is below its predetermined target range, the RRC increases reactor temperature, and when the MI result is above its predetermined target range, the RRC decreases reactor temperature.

In another form, when the ash content is above its predetermined target range and the MI is below its predetermined target range, the RRC increases the reaction temperature set-point, to reduce ash and increase the MI result.

Alternatively, when the ash content is above its predetermined target range and the MI is above its predetermined target range, the RRC increases the monomer concentration, to reduce ash and decrease the MI result.

Also presented herein is a system for maintaining optimum polymerization production in a loop polymerization reactor, comprising, a loop polymerization reactor having hardware associated with modifying reaction parameters including at least monomer concentration, catalyst feed rate and reactor temperature, a digital control system having an executable multivariable reaction rate controller program (RRC) stored therein, which controls the hardware associated with modifying the reaction parameters. The RRC continuously and periodically receives and stores polymerization results comprising at least melt index (MI), production rate and ash content on one or more polymerized monomers, determines whether each of the polymerization results is within predetermined target ranges for those results, stores recently obtained polymerization results in a computer readable database within the RRC, and averages the recently obtained results with previously stored results. When at least one of the polymerization results is out-of-range with respect to its predetermined target range, the RRC modifies at least one reaction parameter set-point comprising monomer concentration, catalyst feed rate and reactor temperature by controlling the associated hardware for modifying reaction parameters to drive any out-of-range polymerization result(s) toward the predetermined target range for that result.

In one form, the system further comprises the RRC assessing the reasonableness of the MI result when the MI result is out-of-range, and if the result is unreasonable, retaining it for comparison to subsequently obtained MI results, without averaging it with previously stored MI results.

In this form, when at least one subsequently obtained MI result is reasonable with respect to a previously-obtained unreasonable MI result, the RRC updating the MI average obtained at current reaction parameter set-point(s).

In another form, when the production rate is above its predetermined target range, the RRC decreases the catalyst feed rate set-point and/or vary the reactor temperature set-point and/or decrease monomer concentration set point until a production rate result reasonable progress rate toward its predetermined target range is established.

In this form, when the MI result is below its predetermined target range, the RRC increases reactor temperature, and when the MI result is above its predetermined target range, the RRC decrease reactor temperature.

In yet another form, when the production rate is within its predetermined target range but the MI result is below its predetermined target range, the RRC can increase the catalyst feed rate set-point and/or increase the reactor temperature set-point and/or decrease monomer concentration set point.

Alternatively, when the production rate is within its predetermined target range but the MI result is above its predetermined target range, the RRC can decrease the catalyst feed rate set-point and/or decrease the reactor temperature set-point and/or increase monomer concentration set point.

In one form, when the production rate is below its predetermined target range, the RRC increases the catalyst feed rate set-point and/or vary the reactor temperature set-point and/or increase monomer concentration set point until a production rate result reasonable progress rate toward its predetermined target range is established.

In this form, when the MI result is below its predetermined target range, the RRC increases reactor temperature, and when the MI result is above its predetermined target range, the RRC decreases reactor temperature.

In another form, when the ash content is above its predetermined target range and the MI is below its predetermined target range, the RRC increases the reaction temperature set-point, to reduce ash and increase the MI result, and when the ash content is above its predetermined target range and the MI is above its predetermined target range, the RRC increases the monomer concentration, to reduce ash and decrease the MI result.

In another form, the hardware associated with controlling reactor temperature includes a cooling system having a variable position coolant valve that incrementally opens and closes to provide more or less cold water flow into a heat exchanger that then cools water jackets of the polymerization reactor, the hardware associated with controlling monomer concentration includes one or more monomer feed valves that incrementally open and close as needed to maintain predetermined monomer flow rates into the polymerization reactor, and the hardware associated with controlling catalyst feed rate includes a semi-continuous shot feeder comprised of a ball-valve that fills with catalyst and then empties the catalyst into the polymerization reactor by turning at a predetermined speed, measured in turns (or drops) per minute.

BRIEF DESCRIPTION OF THE DRAWINGS

The present disclosure is susceptible to various modifications and alternative forms, specific exemplary implementations thereof have been shown in the drawings and are herein described in detail. It should be understood, however, that the description herein of specific exemplary implementations is not intended to limit the disclosure to the particular forms disclosed herein.

DETAILED DESCRIPTION

Figure 1:
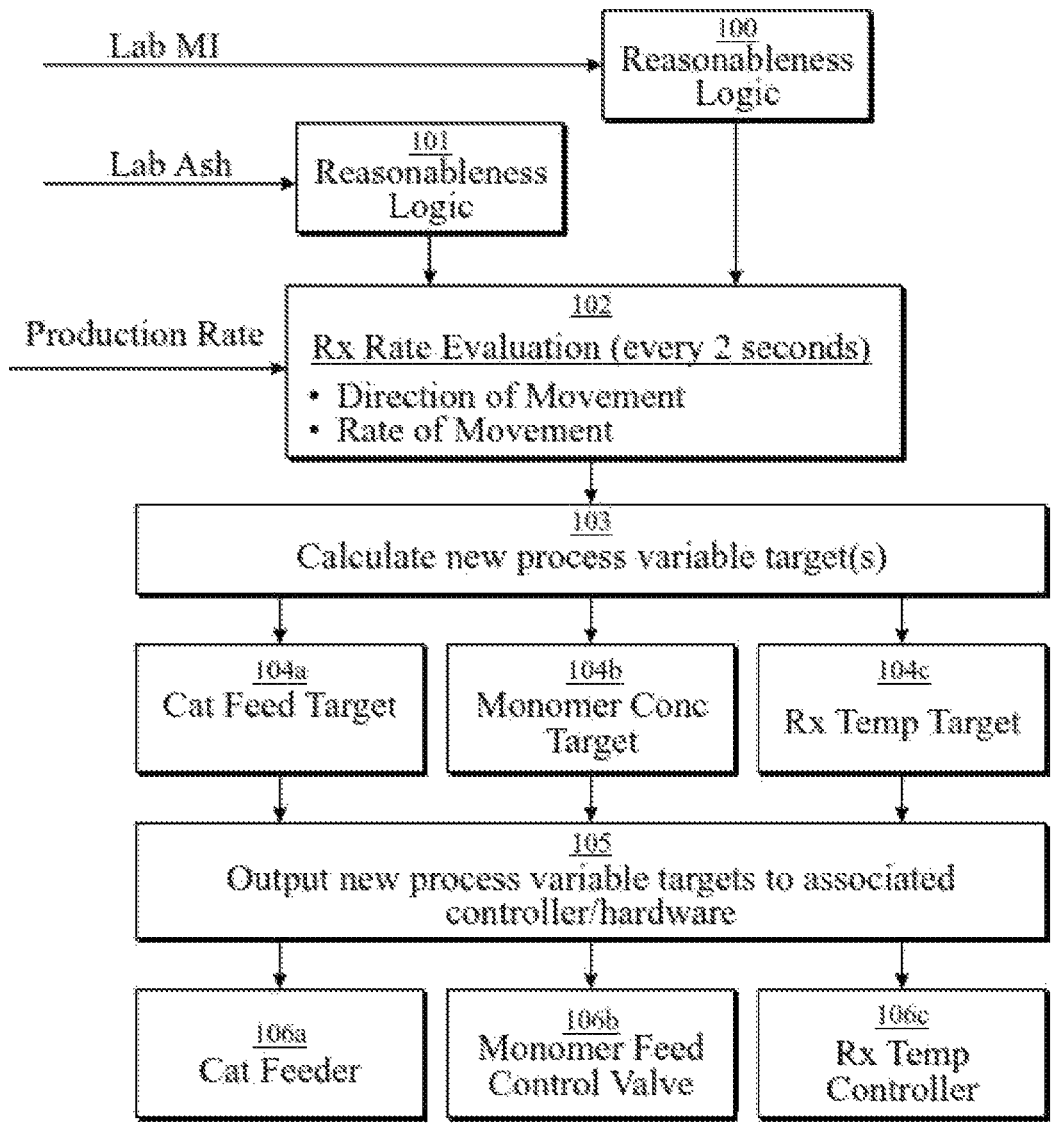
FIG. 1 is a flow chart illustrating the actions of the RRC to maintain or modify MI, production rate and ash content during a loop polymerization process.

According to the present disclosure, the Reactor Rate Controller (RRC) is a multivariable controller program stored within and executable by a process control computer, configured to maintain the conditions within a slurry loop polymerization reactor such that melt index (MI) is on-spec, to drive MI to the MI target range, to drive production rate above the production rate target and maintain production rate within the target production rate, and to maintain ash below the maximum ash limit.

The RRC is designed to provide a single handle to adjust and maintain production rate while maintaining quality control. The RRC executes continuous, incremental changes and therefore increases control precision and opportunities for optimization. The RRC is a robust controller that produces an increase in reactor stability.

The RRC evaluates the polymerization result variables of melt index, production rate and ash content of, for example HDPE, produced in a slurry loop reactor during polymerization and modifies reaction parameter set-points including monomer concentration, catalyst feed rate and reactor temperature to optimize the polymerization results. The RRC uses reasonable progress logic to evaluate the polymerization results of each variable, and uses modification of a combination of the reaction parameter set-points to either drive the results toward an optimum or to maintain the result variables within predetermined target ranges.

Definitions

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than the broadest meaning understood by skilled artisans, such a special or clarifying definition will be expressly set forth in the specification in a definitional manner that provides the special or clarifying definition for the term or phrase.

For example, the following discussion contains a non-exhaustive list of definitions of several specific terms used in this disclosure (other terms may be defined or clarified in a definitional manner elsewhere herein). These definitions are intended to clarify the meanings of the terms used herein. It is believed that the terms are used in a manner consistent with their ordinary meaning, but the definitions are nonetheless specified here for clarity.

A/an: The articles "a" and "an" as used herein mean one or more when applied to any feature in embodiments and implementations of the present invention described in the specification and claims. The use of "a" and "an" does not limit the meaning to a single feature unless such a limit is specifically stated. The term "a" or "an" entity refers to one or more of that entity. As such, the terms "a" (or "an"), "one or more" and "at least one" can be used interchangeably herein.

About: As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

And/or: The term "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements). As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of".

Comprising: In the claims, as well as in the specification, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. Any device or method or system described herein can be comprised of, can consist of, or can consist essentially of any one or more of the described elements.

Ranges: Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and about 200, but also to include individual sizes such as 2, 3, 4, etc. and sub-ranges such as 10 to 50, 20 to 100, etc. Similarly, it should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds). In the figures, like numerals denote like, or similar, structures and/or features; and each of the illustrated structures and/or features may not be discussed in detail herein with reference to the figures. Similarly, each structure and/or feature may not be explicitly labeled in the figures; and any structure and/or feature that is discussed herein with reference to the figures may be utilized with any other structure and/or feature without departing from the scope of the present disclosure.

Aspects of the present invention are described herein with reference to flowchart illustrations and/or block diagrams of methods, apparatus (systems), and computer program products according to embodiments of the invention. It will be understood that at least some of the blocks of the flowchart illustrations and/or block diagrams, and combinations of blocks in the flowchart illustrations and/or block diagrams, can be implemented by computer readable program instructions.

Certain forms disclosed herein are implemented by performing steps or procedures, and sub-steps or sub-procedures, in a manner selected from the group consisting of manually, semi-automatically, fully automatically, and combinations thereof, involving use and operation of system units, system sub-units, devices, assemblies, sub-assemblies, mechanisms, structures, components, and elements, and, peripheral equipment, utilities, accessories, and materials. Moreover, according to actual steps or procedures, sub-steps or sub-procedures, system units, system sub-units, devices, assemblies, sub-assemblies, mechanisms, structures, components, and elements, and, peripheral equipment, utilities, accessories, and materials, used for implementing a particular form, the steps or procedures, and sub-steps or sub-procedures are performed by using hardware, software, and/or an integrated combination thereof, and the system units, sub-units, devices, assemblies, sub-assemblies, mechanisms, structures, components, and elements, and peripheral equipment, utilities, accessories, and materials, operate by using hardware, software, and/or an integrated combination thereof.

For example, software used, via an operating system, for implementing certain forms disclosed herein can include operatively interfaced, integrated, connected, and/or functioning written and/or printed data, in the form of software programs, software routines, software subroutines, software symbolic languages, software code, software instructions or protocols, software algorithms, or a combination thereof. For example, hardware used for implementing certain forms disclosed herein can include operatively interfaced, integrated, connected, and/or functioning electrical, electronic and/or electromechanical system units, sub-units, devices, assemblies, sub-assemblies, mechanisms, structures, components, and elements, and, peripheral equipment, utilities, accessories, and materials, which may include one or more computer chips, integrated circuits, electronic circuits, electronic sub-circuits, hard-wired electrical circuits, or a combination thereof, involving digital and/or analog operations. Certain forms disclosed herein can be implemented by using an integrated combination of the just described exemplary software and hardware.

In certain forms disclosed herein, steps or procedures, and sub-steps or sub-procedures can be performed by a data processor, such as a computing platform, for executing a plurality of instructions. Optionally, the data processor includes volatile memory for storing instructions and/or data, and/or includes non-volatile storage, for example, a magnetic hard-disk and/or removable media, for storing instructions and/or data. Optionally, certain forms disclosed herein include a network connection. Optionally, certain forms disclosed herein include a display device and a user input device, such as a touch screen device, keyboard and/or mouse.

Presented herein is a process for optimizing polymerization of one or more monomers, such as olefin monomers, in a loop polymerization reactor controlled by a reaction rate controller program (RRC). The RRC is stored in and executed by a process control computer, which is itself operatively connected to various hardware elements enabling monitoring and control of various polymerization parameters in a loop polymerization reactor.

The RRC is designed to look and feel like a continuous controller, making small incremental moves on the manipulated variables, such as by making discrete control decisions about every two seconds. For every execution, the RRC looks at the current reaction parameter values, the direction and the rate of movement of the MI, polymer production rate and the ash content of the polymer, and continuously attempts to drive these three controlled variables into their target ranges, according to a particular priority. The polymer MI has the highest priority, the reactor production rate has the next highest priority and the reactor ash has the lowest priority. When the manipulated variables are not constrained, i.e. not at their operational limits, the RRC makes decisions according to normal operational standards. As the reactor temperature, catalyst feed rate and monomer concentration hit operating constraints the RRC will make alternative decisions to maintain control in the order of the RRC's control priority.

The RRC will drive operating parameters to their constraint. When any combination of the manipulable variables: catalyst feed rate, monomer concentration and reactor temperature is at its maximum constraint condition, the RRC makes the decision on how to best continue to control MI and maximize production.

One example of this is when the catalyst feed rate and the temperature are at their maximum limits. In this case monomer concentration is used to control MI and optimize production. If the MI is high, the monomer concentration will be increased, driving MI to the lower end of the MI target range. The RRC logic will attempt to maintain MI in the lower end of the MI range to help maximize production. If MI drops too low, the monomer concentration will be decreased to maintain MI in its target range and some production rate is sacrificed to maintain good MI control.

Reasonable progress logic is used to monitor the rate and direction of MI changes to drive MI to the low end of its range. For example, when catalyst feed rate or monomer concentration is at the maximum limit, and MI is within the MI target range, or MI is making reasonable progress towards the MI target range, the RRC makes MI neutral moves and moves both catalyst feed rate and monomer concentration in the same direction. However during a constraint condition, the RRC will slowly adjust an unconstrained manipulated variable and make the temperature adjustments more aggressively to counteract the catalyst feed rate or monomer concentration moves. In this way production rate will increase while maintaining control of MI.

The RRC has better MI control when the production rate is within the production rate target range. Within the production rate target range, the RRC can move all three manipulated variables to control MI. These are called production rate neutral moves, where catalyst feed rate and monomer concentration are moved in opposite directions (see FIG. 3). Also the RRC will make MI neutral moves when MI is within the MI target range and move catalyst feed rate and monomer concentration in the same direction.

The ash target range is anything below the ash maximum target. So for ash, the limit operates more like an operating constraint. One of the scenarios when controlling ash is when ash is above its maximum target range and MI is low. In this case the RRC increases temperature moves more aggressively to raise MI, which allows for either of catalyst feed rate or monomer concentration, or both to be used to reduce ash. In another case, when the ash content is above its predetermined target range and the MI result is above its predetermined target range, the RRC increases the monomer concentration set-point to return the MI result to its predetermined target range and to reduce the ash content to be within its predetermined target range.

The RRC includes a coolant maximizer, which drives production rate to the production rate target and/or the minimum coolant valve position. If the RRC drives the reactor to operate on the minimum valve position, the logic will attempt to maintain the valve at the minimum valve position. The valve position has a small target range just above the valve position target. When the valve position is within the valve position target range the logic will lower the production rate target so that the production rate is maintained within the production target rate. In this way the reactor's production rate is satisfied and the advantage of being able to adjust all three manipulated variables to control MI can be performed. The RRC will stop driving production rate and instead make production rate neutral moves, thus increasing the likelihood of not exceeding the valve position constraint. If the coolant valve position drops below the valve position target, the RRC will drop the production rate target such that the production rate is above the production rate target range. In this way the RRC will make aggressive moves to reduce the production rate and thereby increasing the coolant valve position. If the coolant valve position is below the coolant valve position target and the MI is above the MI target, then the RRC will stop any temperature adjustments to prevent the valve position from getting worse due to controlling with reactor temperature. In this case the RRC will make more aggressive monomer concentration moves or, if the MI is making reasonable progress, more aggressive monomer concentration and catalyst feed rate moves to bring the coolant valve position above the constraint. If the coolant valve position is below the coolant valve position target and the MI is on the low end of the MI range, the RRC will make decisions on how aggressive monomer concentration and/or catalyst feed rate should be, depending on where the MI is positioned and if the MI is making reasonable progress towards the MI target.

The RRC is continuously and periodically updated with measured polymerization results, such as at least melt index (MI), production rate and ash content on the polymerized monomer, and determines whether each of the polymerization results is within predetermined target ranges for those results. The recently obtained polymerization results are stored in a computer readable database within the reaction rate controller program and averaged with previously stored results. When at least one of the polymerization results is out-of-range with respect to its predetermined target range, the RRC modifies at least one reaction parameter set-point as to monomer concentration, catalyst feed rate and reactor temperature, and controls associated hardware for modifying the reaction parameter set-point(s) to drive any out-of-range polymerization result(s) toward the predetermined target range for that result.

MI can be tested from polymer samples withdrawn during the polymerization process and subjected to melt testing according to ASTM D1238. The production rate can be measured by a mass or energy balance, or a combination of both, utilizing flow rates of incoming polymerization reactor feeds including monomer flow rate, comonomer flow rate and/or hydrogen flow rate, or by heat of reaction as measured by the flow rate and temperature of a heat removal medium, such as cooling water for the reactor. The ash content of the polymer can be measured, for example, by weight differential after incineration of the polymer.

The RRC program includes a smart filter for the MI lab results. The smart filter makes decisions on whether the new MI lab value is reasonable, such as a difference of from about 5% to about 60% from the current MI average. Typically the larger the change in MI, the less of new lab value will be used for control. In some cases, if the change in MI is too large, such as greater than 60%, or if the value is too far outside the MI limits, the smart filter will ignore the lab value and not use it for control. These large MI changes are typically confirmed or denied with the next lab value. If the next new value is close to the value with the large change, the large change is confirmed and the RRC will use most of the new lab value for control.

Thus, during the results measurement process, the RRC assesses the reasonableness of the MI result when the MI result is out-of-range, and if the result is unreasonable, retains it for comparison to subsequently obtained MI results, without averaging it with the previously stored MI results. When at least one subsequently obtained MI result is reasonable with respect to the previously-obtained, unreasonable MI result, the process updates the MI average obtained at current reaction parameter set-point(s). MI results considered reasonable are immediately averaged with previously stored MI results.

The RRC also reviews the polymer production rate in relationship to the production rate target. It will drive production harder at a delta below production rate target and softer as it approaches the production rate target.

When the production rate is above its predetermined target range, the RRC decreases the catalyst feed rate set-point and/or vary the reactor temperature set-point and/or decrease monomer concentration set point until a production rate result reasonable progress rate toward its predetermined target range is established. If during this phase, the MI result is below its predetermined target range, the RRC increases reactor temperature, and if the MI result is above its predetermined target range, the RRC decreases reactor temperature. When production rate is above the production rate target and within the production rate target range, the optimization of catalyst is regulated by the MI optimum value. When the MI is above its optimum value, the catalyst concentration in the reactor is too high, and when the MI is below its optimum value the catalyst concentration in the reactor is too low. The RRC will make continuous adjustments to optimize the catalyst feed rate and the resulting catalyst concentration.

When the production rate is within its predetermined target range but the MI result is below its predetermined target range, the RRC can increase the catalyst feed rate set-point and/or increase the reactor temperature set-point and/or decrease monomer concentration set point. When the production rate is within its predetermined target range but the MI result is above its predetermined target range, the RRC can decrease the catalyst feed rate set-point and/or decrease the reactor temperature set-point and/or increase monomer concentration set point.

When the production rate is below its predetermined target range, the RRC increases the catalyst feed rate set-point and/or varies the reactor temperature set-point and/or increases monomer concentration set point until a production rate result reasonable progress rate toward its predetermined target range is established. In this case, when MI is above the MI an optimum value, the RRC will get more aggressive in adding monomer and less aggressive in decreasing temperature in an attempt to reduce MI. When the MI is below the optimum value, the RRC will add catalyst and the temperature will return to normal tuning. In this situation, i.e. while driving production rate, monomer concentration will be the leading factor and the reactor will operate with excess monomer, and catalyst feed rate will be the lagging factor, attempting to consume the excess monomer. While driving production rate, the RRC uses this lead/lag operation.

The RRC has some special constraint conditions for controlling ash and some optimization functions. The RRC uses ash content to optimize when the reactor is operating with MI at the lower end of the scale, ash content is below a defined low target and catalyst feed rate is below its high limit. In this scenario the RRC will favor an increase in catalyst feed rate as the primary manipulated variable to control polymer MI. Also a special constraint condition is when ash content is high, the reactor temperature at its maximum limit and polymer MI is at the low end of the scale. In this scenario the RRC will decrease reactor monomer concentration to control MI and ash.

Accordingly, when the ash content is above its predetermined target range and the MI is above its predetermined target range, the RRC increases the monomer concentration, to reduce ash and decrease the MI result.

FIG. 1 is a block diagram showing the general progression through the RRC process. Laboratory-measured MI and ash contents are entered into the program, passing first through reasonableness logic algorithms 100, 101 to determine whether the measured laboratory values are within reason, as described with respect to MI above. If the values are determined to be reasonable, they are saved and entered into the reaction rate portion of the program 102, which evaluates the reaction rate about every two seconds as to direction of reaction rate movement, rate of reaction rate movement and the current value in relation to the reaction rate target value. If one or more of the evaluation parameters of the reaction rate is unsatisfactory, the RRC calculates one or more new process variable target(s) 103, including catalyst feed rate target 104a, monomer concentration target 104b and reaction temperature target 104c, and applies these values to the various associated hardware controlling these process variables 105, including a catalyst feeder 106a, a monomer feed control valve 106b and a temperature controller 106c. One element of the temperature controller 106c is a coolant valve 620 (FIG. 4), the opening of which varies the amount of cooling water delivered to a coolant jacket surrounding the loop reactor.

Figure 2:
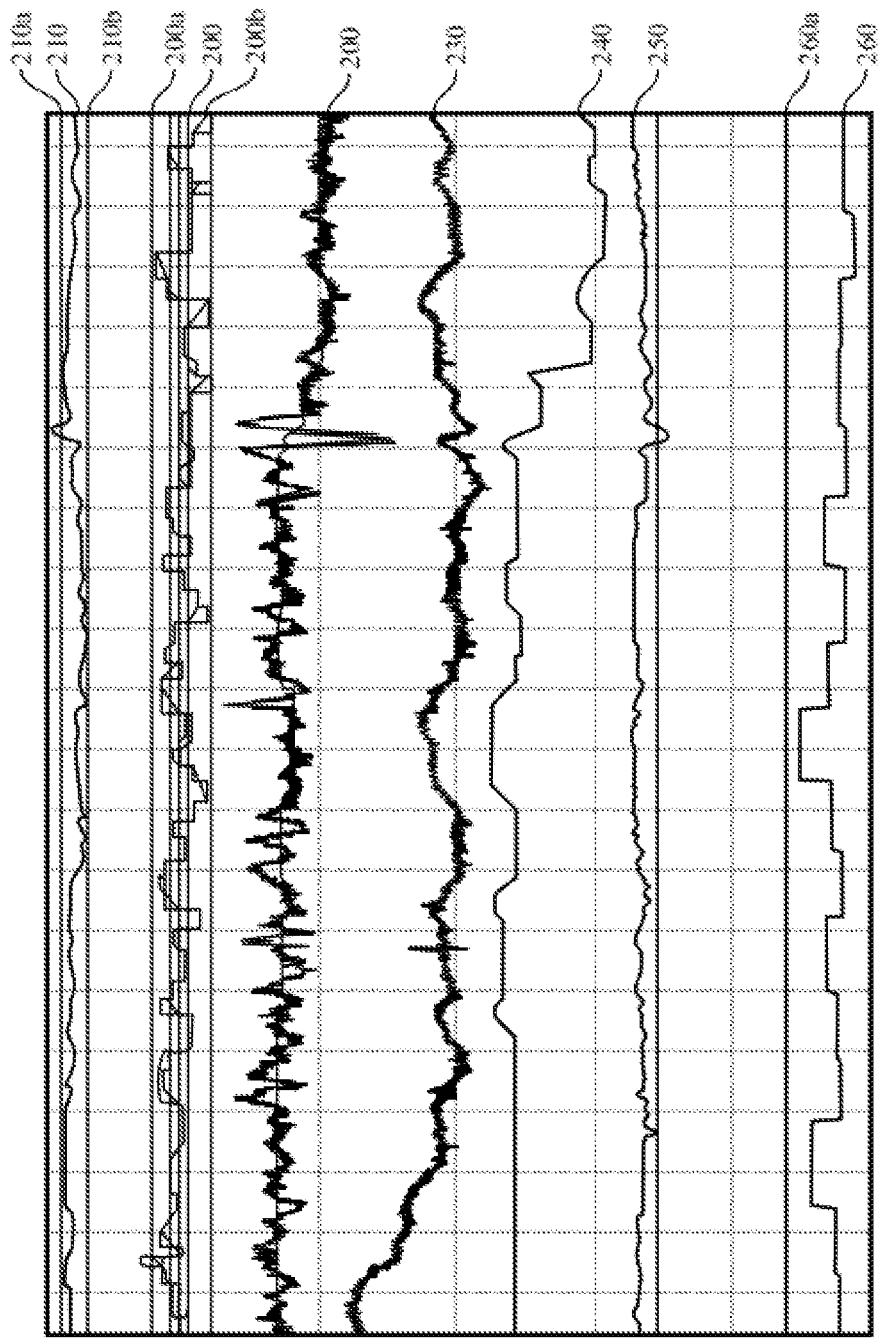
FIGS. 2 and 3 are screen shots of the RRC monitor showing three day traces of reactor activities and controls.
Figure 3:
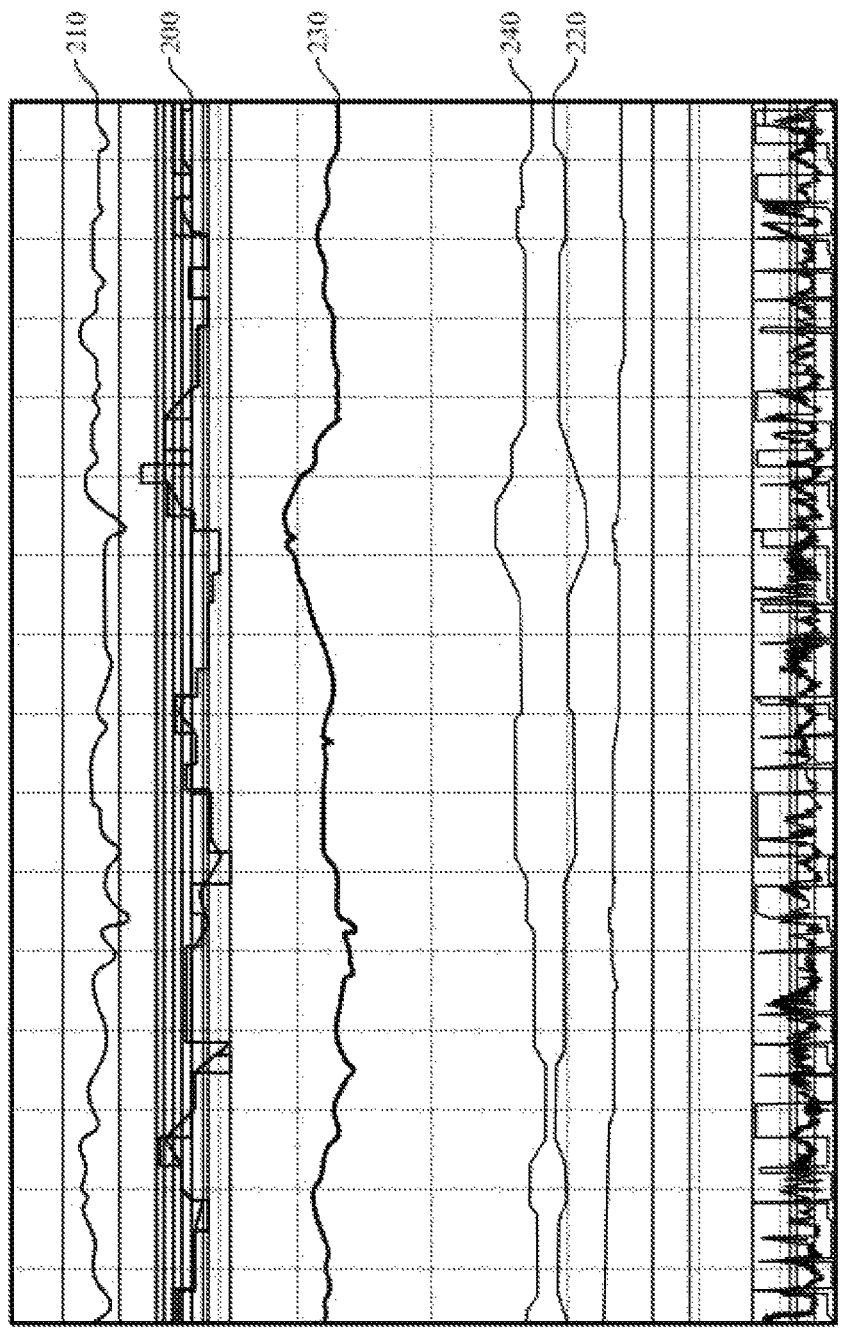

FIGS. 2 and 3 are screen prints of the RRC monitor over a period of 3 days, showing normal operation for quality and rate control (FIG. 2), and an example of rate and MI neutral changes/movements (FIG. 3). In FIG. 2, the upper limit of the MI target range is identified as 200a, the lower limit 200b and the actual MI result is 200. The upper limit of the production rate is identified as 210a, the lower limit 210b and the actual production rate result is 210. The upper limit of ash content is identified as 260a and the actual ash content result is 260. The actual coolant valve position is identified as 250. The manipulable process variables are monomer concentration 220, reactor temperature 230 and catalyst feed rate 240. The data in FIG. 3 is similarly identified, although the limits are not labeled.

Figure 4:
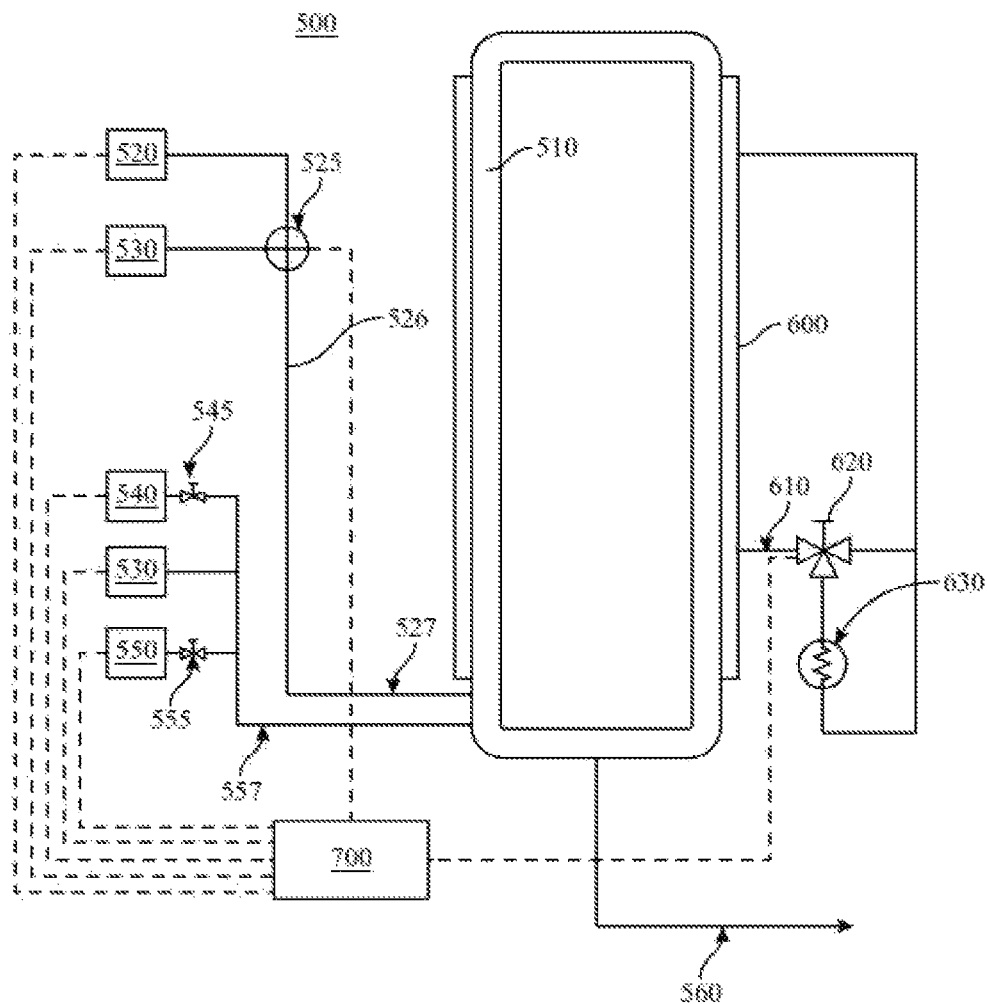
FIG. 4 is a diagrammatic representation of the loop reactor system described herein.

FIG. 4 shows a system 500 for maintaining optimum polymerization production in a loop polymerization reactor 510, comprising a loop polymerization reactor 510 having hardware associated with modifying reaction parameters. The system includes a catalyst reservoir 520, a diluent reservoir 530 and a ball-valve 525 connecting them, which when rotated delivers a shot of catalyst and diluent into inlet line 526 and into the reactor loop through line 527. The faster the ball-valve is rotated, the more catalyst/diluent is delivered. Catalyst delivery is measured in drops-per-minute. The system also includes at least two monomer reservoirs 540 and 550 along with their associated control valves 545 and 555 respectively, enabling variation of monomer concentration in diluent leaving a second diluent reservoir 530, and ultimately into the loop reactor 510 through inlet line 557. Loop reactor 510 also includes a coolant jacket 600, to which coolant is fed through coolant line 610, which can be cooled through heat exchanger 630. Control of coolant feed is accomplished with coolant valve 620. The polymerized polymer leaves loop reactor 510 through exit line 560.

Manipulable process variables include at least monomer concentration, catalyst feed rate and reactor temperature, which are controlled by digital control system 700 having an executable multivariable reaction rate reaction rate controller program (RRC) stored therein, which is connected to and controls the hardware associated with modifying the reaction parameters. The operation of the RRC is described in detail above.

The RRC's MI control includes a PID controller that employs Dynamic Tune Logic (DTL) to adjust the reactor temperature. The DTL uses reasonable progress logic to make continuous control decisions, as disclosed in U.S. Serial No. 15/584,352, filed May 2, 2017, now U.S. Pat. No. 11,097,244, issued Aug. 24, 2021, which is incorporated herein by reference in its entirety, wherein a reasonable progress curve is determined based on the separately measured values of a control variable. The DTL is part of the MI control portion of the RRC to perform more responsive temperature moves to aid in MI control.

Further illustrative, non-exclusive examples of systems and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

PCT1. A process for optimizing polymerization of a monomer in a loop polymerization reactor controlled by a reaction rate controller program, comprising continuously and periodically obtaining polymerization results comprising at least melt index (MI), production rate and ash content on the polymerized monomer, the reaction rate controller program (RRC) determining whether each of the polymerization results is within predetermined target ranges for those results, storing recently obtained polymerization results in a computer readable database stored within the RRC, and averaging the recently obtained results with previously stored results, and when at least one of the polymerization results is out-of-range with respect to its predetermined target range, modifying at least one reaction parameter set-point comprising monomer concentration, catalyst feed rate and reactor temperature, and controlling associated hardware for modifying reaction parameter set-point(s) to drive any out-of-range polymerization result(s) toward the predetermined target range for that result.

PCT2. The process of PCT1, which further comprises the RRC assessing the reasonableness of the MI result when the MI result is out-of-range, and if the result is unreasonable, retaining it for comparison to subsequently obtained MI results, without averaging it with previously stored MI results, and when at least one subsequently obtained MI result is reasonable with respect to a previously-obtained unreasonable MI result, the RRC updating the MI average obtained at current reaction parameter set-point(s).

PCT3. The process of paragraph PCT1 or PCT2, wherein when the production rate is above its predetermined target range, the RRC decreases the catalyst feed rate set-point and/or vary the reactor temperature set-point and/or decrease monomer concentration set point until a production rate result reasonable progress rate toward its predetermined target range is established.

PCT4. The process of any of paragraphs PCT1 to PCT3, wherein when the MI result is below its predetermined target range, the RRC increases reactor temperature, and when the MI result is above its predetermined target range, the RRC decreases reactor temperature PCT5. The process of any of paragraphs PCT1 to PCT4, wherein when the production rate is within its predetermined target range but the MI result is below its predetermined target range, the RRC can increase the catalyst feed rate set-point and/or increase the reactor temperature set-point and/or decrease monomer concentration set point.

PCT6. The process of any of paragraphs PCT1 to PCT5, wherein when the production rate is within its predetermined target range but the MI result is above its predetermined target range, the RRC can decrease the catalyst feed rate set-point and/or decrease the reactor temperature set-point and/or increase monomer concentration set point.

PCT7. The process of any of paragraphs PCT1 to PCT6, wherein when the production rate is below its predetermined target range, the RRC increases the catalyst feed rate setpoint and/or vary the reactor temperature set-point and/or increase monomer concentration set point until a production rate result reasonable progress rate toward its predetermined target range is established.

PCT8. The process of any of paragraphs PCT1 to PCT7, wherein when the MI result is below its predetermined target range, the RRC increases reactor temperature, and when the MI result is above its predetermined target range, the RRC decreases reactor temperature.

PCT9. The process of any of paragraphs PCT1 to PCT8, wherein when the ash content is above its predetermined target range and the MI is below its predetermined target range, the RRC increases the reaction temperature set-point, to reduce ash and increase the MI result.

PCT10. The process of any of paragraphs PCT1 to PCT9, wherein when the ash content is above its predetermined target range and the MI is above its predetermined target range, the RRC increases the monomer concentration, to reduce ash and decrease the MI result.

PCT11. A system for maintaining optimum polymerization production in a loop polymerization reactor, comprising, a loop polymerization reactor having hardware associated with modifying reaction parameters including at least monomer concentration, catalyst feed rate and reactor temperature, a digital control system having an executable multivariable reaction rate controller program (RRC) stored therein, which controls the hardware associated with modifying the reaction parameters. The RRC continuously and periodically receives and stores polymerization results comprising at least melt index (MI), production rate and ash content on one or more polymerized monomers, determines whether each of the polymerization results is within predetermined target ranges for those results, stores recently obtained polymerization results in a computer readable database within the RRC, and averages the recently obtained results with previously stored results. When at least one of the polymerization results is out-of-range with respect to its predetermined target range, the RRC modifies at least one reaction parameter set-point comprising monomer concentration, catalyst feed rate and reactor temperature by controlling the associated hardware for modifying reaction parameters to drive any out-of-range polymerization result (s) toward the predetermined target range for that result.

PCT12. The system of paragraph PCT11, further comprising the RRC assessing the reasonableness of the MI result when the MI result is out-of-range, and if the result is unreasonable, retaining it for comparison to subsequently obtained MI results, without averaging it with previously stored MI results.

PCT13. The system of paragraph PCT11 or PCT12, wherein when at least one subsequently obtained MI result is reasonable with respect to a previously-obtained unreasonable MI result, the RRC updating the MI average obtained at current reaction parameter set-point(s).

PCT14. The system of any of paragraphs PCT11 to PCT13, wherein when the production rate is above its predetermined target range, the RRC decreases the catalyst feed rate set-point and/or vary the reactor temperature set-point and/or decrease monomer concentration set point until a production rate result reasonable progress rate toward its predetermined target range is established.

PCT15. The system of any of paragraphs PCT11 to PCT14, wherein when the MI result is below its predetermined target range, the RRC increases reactor temperature, and when the MI result is above its predetermined target range, the RRC decrease reactor temperature.

PCT16. The system of any of paragraphs PCT11 to PCT15, wherein when the production rate is within its predetermined target range but the MI result is below its predetermined target range, the RRC can increase the catalyst feed rate set-point and/or increase the reactor temperature set-point and/or decrease monomer concentration set point.

PCT17. The system of any of paragraphs PCT11 to PCT16, wherein when the production rate is within its predetermined target range but the MI result is above its predetermined target range, the RRC can decrease the catalyst feed rate set-point and/or decrease the reactor temperature set-point and/or increase monomer concentration set point.

PCT18. The system of any of paragraphs PCT11 to PCT17, wherein when the production rate is below its predetermined target range, the RRC increases the catalyst feed rate set-point and/or vary the reactor temperature set-point and/or increase monomer concentration set point until a production rate result reasonable progress rate toward its predetermined target range is established.

PCT19. The system of any of paragraphs PCT11 to PCT18, wherein when the MI result is below its predetermined target range, the RRC increases reactor temperature, and when the MI result is above its predetermined target range, the RRC decreases reactor temperature.

PCT20. The system of any of paragraphs PCT11 to PCT19, wherein when the ash content is above its predetermined target range and the MI is below its predetermined target range, the RRC increases the reaction temperature set-point, to reduce ash and increase the MI result, and when the ash content is above its predetermined target range and the MI is above its predetermined target range, the RRC increases the monomer concentration, to reduce ash and decrease the MI result.

PCT21. The system of any of paragraphs PCT11 to PCT20, wherein the hardware associated with controlling reactor temperature includes a cooling system having a variable position coolant valve that incrementally opens and closes to provide more or less cold water flow into a heat exchanger that then cools water jackets of the polymerization reactor, the hardware associated with controlling monomer concentration includes one or more monomer feed valves that incrementally open and close as needed to maintain predetermined monomer flow rates into the polymerization reactor, and the hardware associated with controlling catalyst feed rate includes a semi-continuous shot feeder comprised of a ball-valve that fills with catalyst and then empties the catalyst into the polymerization reactor by turning at a predetermined speed, measured in turns (or drops) per minute.

INDUSTRIAL APPLICABILITY

The systems and methods disclosed herein are applicable to the polymer industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

What is claimed is:

1. A process for polymerization of a monomer in a loop polymerization reactor controlled by a reaction rate controller program, comprising:
   continuously and periodically obtaining polymerization results comprising at least melt index (MI), production rate and ash content on the polymerized monomer;
   the reaction rate controller program (RRC):
      determining whether each of the polymerization results is within predetermined target ranges for those results;
      storing recently obtained polymerization results in a computer readable database stored within the RRC, and averaging the recently obtained results with previously stored results; and
      when at least one of the polymerization results is out-of-range with respect to its predetermined target range, modifying at least one reaction parameter set-point comprising monomer concentration, catalyst feed rate or reactor temperature, and controlling associated hardware for modifying reaction parameter set-point(s) to drive any out-of-range polymerization result(s) toward the predetermined target range for that result.

2. The process of claim 1, further comprising the RRC assessing the reasonableness of the MI result when the MI result is out-of-range, and if the result is unreasonable, retaining it for comparison to subsequently obtained MI results, without averaging it with previously stored MI results.

3. The process of claim 1, wherein when the production rate is above its predetermined target range, the RRC decreases the catalyst feed rate set-point and/or varies the reactor temperature set-point and/or decreases monomer concentration set point until a production rate result reasonable progress rate toward its predetermined target range is established.

4. The process of claim 3, wherein: (i) when the MI result is below its predetermined target range, the RRC increases reactor temperature; and/or (ii) when the MI result is above its predetermined target range, the RRC decreases reactor temperature.

5. The process of claim 1, wherein:
   (iii) when the production rate is within its predetermined target range but the MI result is below its predetermined target range, the RRC increases the catalyst feed rate set-point and/or increases the reactor temperature set-point and/or decreases monomer concentration set point; and/or
   (iv) further wherein, when the production rate is within its predetermined target range but the MI result is above its predetermined target range, the RRC decreases the catalyst feed rate set-point and/or decreases the reactor temperature set-point and/or increases monomer concentration set point.

6. The process of claim 1, wherein when the production rate is below its predetermined target range, the RRC increases the catalyst feed rate set-point and/or varies the reactor temperature set-point and/or increases monomer concentration set point until a production rate result reasonable progress rate toward its predetermined target range is established.

7. The process of claim 1, wherein: (v) when the MI result is below its predetermined target range, the RRC increases reactor temperature; and/or (vi) when the MI result is above its predetermined target range, the RRC decreases reactor temperature.

8. The process of claim 1, wherein:
   (vii) when the ash content is above its predetermined target range and the MI is below its predetermined target range, the RRC increases the reaction temperature set-point, to reduce ash and increase the MI result; and/or (viii) when the ash content is above its predetermined target range and the MI is above its predetermined target range, the RRC increases the monomer concentration, to reduce ash and decrease the MI result.

9. A system for maintaining polymerization production in a loop polymerization reactor, comprising:
   a loop polymerization reactor having hardware associated with modifying reaction parameters including at least monomer concentration, catalyst feed rate and reactor temperature;
   a digital control system having an executable multivariable reaction rate controller program (RRC) stored therein, which controls the hardware associated with modifying the reaction parameters;
   wherein the RRC:
      continuously and periodically receives and stores polymerization results comprising at least melt index (MI), production rate and ash content on one or more polymerized monomers;
      determines whether each of the polymerization results is within predetermined target ranges for those results;
      stores recently obtained polymerization results in a computer readable database within the RRC, and averages the recently obtained results with previously stored results; and
      when at least one of the polymerization results is out-of-range with respect to its predetermined target range, the RRC modifies at least one reaction parameter set-point comprising monomer concentration, catalyst feed rate or reactor temperature by controlling the associated hardware for modifying reaction parameters to drive any out-of-range polymerization result(s) toward the predetermined target range for that result.

10. The system of claim 9, further comprising the RRC assessing the reasonableness of the MI result when the MI result is out-of-range, and if the result is unreasonable, retaining it for comparison to subsequently obtained MI results, without averaging it with previously stored MI results.

11. The system of claim 10, wherein when at least one subsequently obtained MI result is reasonable with respect to a previously-obtained unreasonable MI result, the RRC updating the MI average obtained at current reaction parameter set-point(s).

12. The system of claim 9, wherein when the production rate is above its predetermined target range, the RRC decreases the catalyst feed rate set-point and/or varies the reactor temperature set-point and/or decreases monomer concentration set point until a production rate result reasonable progress rate toward its predetermined target range is established.

13. The system of claim 12, wherein (i) when the MI result is below its predetermined target range, the RRC increases reactor temperature; and/or (ii) when the MI result is above its predetermined target range, the RRC decreases reactor temperature.

14. The system of claim 9, wherein:
(iii) when the production rate is within its predetermined target range but the MI result is below its predetermined target range, the RRC increases the catalyst feed rate set-point and/or increases the reactor temperature set-point and/or decreases monomer concentration set point; and/or
(iv) when the production rate is within its predetermined target range but the MI result is above its predetermined target range, the RRC increases the catalyst feed rate set-point and/or decreases the reactor temperature set-point and/or increases monomer concentration set point.

15. The system of claim 9, wherein when the production rate is below its predetermined target range, the RRC increases the catalyst feed rate set-point and/or varies the reactor temperature set-point and/or increases monomer concentration set point until a production rate result reasonable progress rate toward its predetermined target range is established.

16. The system of claim 15, wherein: (v) when the MI result is below its predetermined target range, the RRC increases reactor temperature; and/or (vi) when the MI result is above its predetermined target range, the RRC decreases reactor temperature.

17. The system of claim 9, wherein: (vii) when the ash content is above its predetermined target range and the MI is below its predetermined target range, the RRC increases the reaction temperature set-point, to reduce ash and increase the MI result; and/or (viii) when the ash content is above its predetermined target range and the MI is above its predetermined target range, the RRC increases the monomer concentration, to reduce ash and decrease the MI result.

18. The system of claim 9, wherein the hardware associated with controlling reactor temperature includes a cooling system having a variable position coolant valve that incrementally opens and closes to provide more or less water flow into a heat exchanger that then cools water jackets of the polymerization reactor.

19. The system of claim 9, wherein the hardware associated with controlling monomer concentration includes one or more monomer feed valves that incrementally open and close as needed to maintain predetermined monomer flow rates into the polymerization reactor.

20. The system of claim 9, wherein the hardware associated with controlling catalyst feed rate includes a semi-continuous shot feeder comprised of a ball-valve that fills with catalyst and then empties said catalyst into the polymerization reactor by turning at a predetermined speed, measured in turns (or drops) per minute.

* * * * *